Dec. 5, 1944.  J. J. NEFF  2,364,237
ELECTRICAL CALIPER
Filed Nov. 8, 1943

INVENTOR.
JOSEPH J. NEFF
BY
Frank H. Harmon
ATTORNEY

Patented Dec. 5, 1944

2,364,237

UNITED STATES PATENT OFFICE 2,364,237

ELECTRICAL CALIPER

Joseph J. Neff, South Euclid, Ohio, assignor, by mesne assignments, to Jack & Heintz, Inc., Cleveland, Ohio, a corporation of Ohio Application November 8, 1943, Serial No. 509,410

3 Claims. (Cl. 33—147)

This invention relates to an improvement in precision outside calipers and has for its primary object to provide an electrical means to quickly determine the outside diameter or thickness of a piece of work.

Another object of this invention is to provide a visual indicating means for measuring the outside diameter or thickness of a piece of work, thereby eliminating the necessity of making several adjustments of a vernier to determine a precise dimension as is necessary on most calipers.

With these and other objects in view, the invention resides in the combination of parts and in the details of construction and operation hereinafter set forth in the following specification and appended claims, certain embodiments thereof being illustrated in the accompanying drawing in which:

Figure 1:
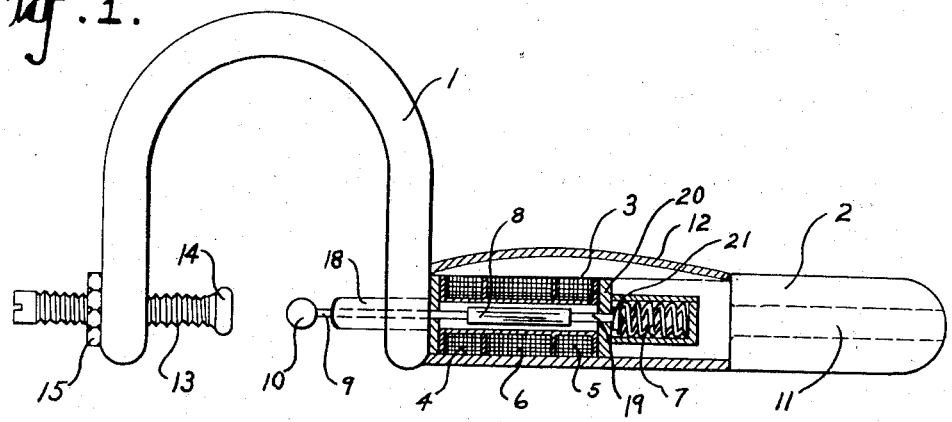
Figure 1 is a partially cross-sectioned view in side elevation of an electrical caliper less the electrical connections.

Referring more particularly to Figure 1, a U-shaped caliper frame 1 is shown with a partially hollowed handle 2 attached thereto. Inserted in the hollow portion of handle 2 adjacent to the caliper frame 1 is a displacement pickup mechanism 3 having pickup coils 4 and 5, a driving coil 6, an aligning spring 7, an armature 8, a stylus finger 9, and a stylus ball point 10. The right end portion of handle 2 is provided with a bore 11 through which the electrical connections between the displacement pickup mechanism and the energizing and measuring devices are made. Also, to accommodate the connections among the coils 4, 5 and 6, a raised portion 12 is provided in the forward end of handle 2. The electrical connections are not shown in Figure 1 to avoid confusion in the handle portion of the drawing.

On the opposite side of caliper frame 1 and aligned coaxially with the stylus finger 9 is an adjustable abutment having a flat head end portion 14 and a locknut 15 threaded thereon.

A stud 18 is provided on the frame 1 to guide the stylus finger 9 and to keep it from being bent as the caliper engages work. The opposite side of armature 8 is aligned by movement of shaft 19 through the wall portion 20 of the pickup mechanism. This shaft 19 has a head 21 which engages the spring 7.

Figure 2:
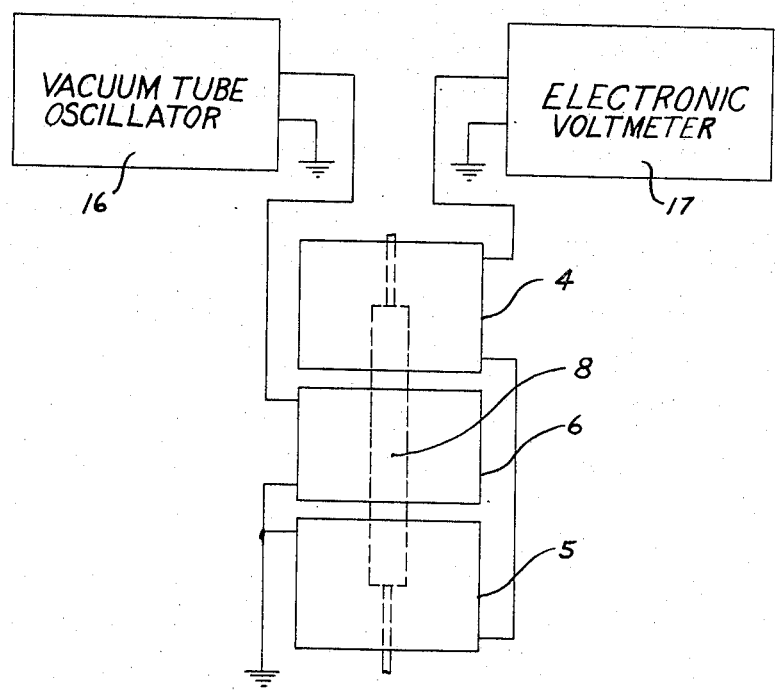
Figure 2 is a block diagram of an electrical circuit for the caliper.

Figure 2 shows the circuit of the caliper in block form as having a vacuum tube oscillator 16 for supplying alternating current to driving coil 6 and an electronic voltmeter 17 for detecting differences of induced voltages in pickup coils 4 and 5. The armature 8 is shown in its electrical center position within the three coils. Pickup coils 4 and 5 are shown connected in electrical opposition. When the caliper is not engaging work, spring 7 normally maintains the armature 8 in the electrical center of the coils.

Measurement by use of the caliper is dependent upon the position of the armature 8 within coils 4, 5 and 6. When driving coil 6 receives a signal from the oscillator 16, opposing induced voltages are set up in pickup coils 4 and 5. When armature 8 is in the electrical center of the 3 coils, the opposing induced voltages in coils 4 and 5 exactly counterbalance each other and no indication will be given by the voltmeter 17. In Figure 1, if the stylus is moved toward the handle 2 against the action of spring 7, the armature 8 is displaced from its electrical center. More voltage will be induced in coil 5 than in coil 4 due to the fact that shifting the armature, which has a high permeability, results in a shift in the position of the magnetic field set up by the driving coil 6 in the direction of the movement of the armature, causing more lines of force to cut the turns of coil 5 than cut coil 4.

In measuring the thickness or diameter of work in production qualities, considerable time is used on each piece to make vernier adjustments on a caliper to determine if the work has been finished within specified tolerances. This invention eliminates the necessity of any mechanical adjustments in the caliper after an initial adjustment of the abutment 13, by substituting the displacement pickup for the standard caliper scales.

Abutment 13 is adjusted until the distance between head 14 and stylus 10 is such that a piece of work of true or reference thickness or diameter, when inserted between the head and the stylus, will cause enough deflection of the stylus to move the armature from its electrical center the proper amount to give a midscale reading on the voltmeter scale. When this adjustment is completed, lock nut 15 is tightened against frame 1 to hold the abutment 13 firm in its position. The scale of voltmeter 17, which is calibrated in linear dimension units, has a midscale reading of zero. Thus a piece of work of true or reference diameter or thickness will give a zero reading on the voltmeter. Work which has a smaller than reference diameter or thickness will, when placed between head 14 and stylus 10, give a reading on the voltmeter less than zero. This is due to the fact that the armature 8 is not displaced as much by this smaller than reference work and consequently the difference in induced voltages between pickup coils 4 and 5 is not as great. The same is true in the opposite sense of work having a larger diameter or thickness than work of reference diameter.

It is merely necessary then for the operator to watch the voltmeter scale to see if each piece of work in a production run when inserted in the caliper has a diameter or thickness within desired tolerance limits. The voltmeter is so designed that its sensitivity may be adjusted depending on the precision desired in the measurement of work. The pickup mechanism is capable of accurate measurements in the order of tenths of thousandths of an inch. It is thus seen that this electrical caliper provides both a quick and precise means of determining the true diameter or thickness of work being tested in production quantities.

I claim:

1. An electrical caliper comprising a U-shaped frame, a partially tubular handle attached to one side of the frame, said handle having a bore at one end, a displacement pickup mechanism fixed within the tubular portion of the handle adjacent to the frame, said mechanism including a driving coil and two pickup coils, one of said pickup coils being mounted on either side of the driving coil and all of said coils being wound about the same axis, an armature centrally disposed within the coils, a spring acting on said armature shaft to normally maintain the armature in its central position within the coils, a stylus finger attached to the armature and a stylus ball fixed to the end of the stylus finger, a stud attached to the frame to guide the stylus finger, and an adjustable abutment mounted on the opposite side of the frame so as to be coaxial with the stylus finger.

2. In combination for the purpose of obtaining an immediate visual indication of the diameter or thickness of a piece of work, a caliper including a U-shaped frame, a partially tubular handle attached to one side of the frame, a displacement pickup mechanism mounted within the tubular portion of the handle, said mechanism including a driving coil and two pickup coils, the pickup coils being mounted one on either side of the driving coil and all of said coils being wound about the same axis, an armature normally held centrally within the coils by means of a spring, and a stylus finger having a ball point attached directly to the armature, and an adjustable abutment mounted on the opposite side of the caliper frame so as to be coaxial with the stylus finger of the displacement pickup mechanism, a vacuum tube oscillator for supplying alternating current to said driving coil and an electronic voltmeter in circuit with said pickup coils for detecting differences of induced voltages therein.

3. In a combination for the purpose of obtaining an immediate visual indication of the diameter or thickness of a piece of work, a caliper including a U-shaped frame, a partially tubular handle attached to one side of the frame, a displacement pickup mechanism mounted within the tubular portion of the handle, said mechanism including a driving coil and two pickup coils, the pickup coils being mounted one on either side of the driving coil and all of said coils being wound about the same axis, an armature normally held centrally within the coils by means of a spring, and a stylus finger having a ball point attached directly to the armature, and an adjustable abutment mounted on the opposite side of the caliper frame so as to be coaxial with the stylus finger of the displacement pickup mechanism, oscillator means to energize the driving coil of the pickup mechanism thereby setting up a magnetic field, means responsive to any movement of the stylus finger, occurring as work is passed between the adjustable abutment and the stylus point, to cause a displacement of the armature from its central position within the coils, means responsive to movement of the armature for moving the magnetic field set up by the driving coil in the direction of movement of the armature so that more voltage is induced in one pickup coil than in the other, and electronic voltmeter means to measure the difference between the induced voltages in the pickup coils, and to visually indicate in linear dimensional units that difference by means of a properly calibrated scale.

JOSEPH J. NEFF.